(12) United States Patent
Lourenco et al.

(10) Patent No.: US 8,088,528 B2
(45) Date of Patent: Jan. 3, 2012

(54) METHOD TO CONDENSE AND RECOVER CARBON DIOXIDE FROM FUEL CELLS

(76) Inventors: Jose Lourenco, Edmonton (CA); MacKenzie Millar, Edmonton (CA)

( * ) Notice: Subject to any disclaimer, the term of this patent is extended or adjusted under 35 U.S.C. 154(b) by 0 days.

(21) Appl. No.: 12/515,734

(22) PCT Filed: Nov. 20, 2007

(86) PCT No.: PCT/CA2007/002062
§ 371 (c)(1),
(2), (4) Date: May 20, 2009

(87) PCT Pub. No.: WO2008/061345
PCT Pub. Date: May 29, 2008

(65) Prior Publication Data
US 2010/0215566 A1    Aug. 26, 2010

(30) Foreign Application Priority Data
Nov. 20, 2006    (CA) ...................................... 2569006

(51) Int. Cl.
*H01M 8/04* (2006.01)
(52) U.S. Cl. ...................................... 429/435
(58) Field of Classification Search .............. 423/437.1; 429/410, 433–442, 502, 505
See application file for complete search history.

(56) References Cited

U.S. PATENT DOCUMENTS

| 3,002,362 A | * | 10/1961 | Morrison | ......................... 62/402 |
| 4,751,151 A | | 6/1988 | Healy | |
| 6,432,565 B1 | * | 8/2002 | Haines | ........................... 429/416 |

FOREIGN PATENT DOCUMENTS

| CA | 2299695 A1 | 3/1999 |
| EP | 0482222 A1 | 4/1992 |

OTHER PUBLICATIONS

International Search Report mailed Mar. 14, 2008, in corresponding International Application No. PCT/CA2007/02062, filed Nov. 20, 2007.

* cited by examiner

*Primary Examiner* — Wayne Langel
*Assistant Examiner* — Justin Bova
(74) *Attorney, Agent, or Firm* — Christensen O'Connor Johnson Kindness PLLC

(57) ABSTRACT

A method to condense and recover carbon dioxide. A first step involve providing at more than one heat exchanger, with each heat exchanger having a first flow path for passage of a first fluid and a second flow path for passage of a second fluid. A second step involves passing a stream of very cold natural gas sequentially along the first flow path of each heat exchanger until it is heated for distribution and concurrently passing a gaseous stream rich in carbon dioxide sequentially along the second flow path of each heat exchanger, allowing a gaseous portion of the gaseous stream rich in carbon dioxide to pass to a next sequential heat exchanger and capturing in a collection vessel the condensed carbon dioxide. This processes results in a cryogenic heat exchange in which natural gas at Metering and Pressure Reduction Stations is first cooled by reducing its pressure through a gas expander or a pressure reducing valve and then heated in a series of stages and the gaseous stream rich in carbon dioxide stream is separated in a series of stages through sequential cryogenic carbon dioxide separation and recovery.

1 Claim, 2 Drawing Sheets

METHOD TO CONDENSE AND RECOVER CARBON DIOXIDE FROM FUEL CELLS

FIELD OF THE INVENTION

The present invention relates to a method of recovering carbon dioxide emitted from a fuel cell at gas Metering and Pressure Reduction Stations.

BACKGROUND OF THE INVENTION

In gas Metering and Pressure Reduction Stations, the gas is pre-heated before the pressure is dropped to prevent the formation of hydrates which can cause damage to the pipeline and associated equipment. The typical pressure reduction varies between 400 to 900 PSIG (pounds per square inch gage) for main transmission gas lines to local distribution lines and from 50 to 95 PSIG from local distribution lines to consumers. When gas is depressurised the temperature drops. The rule of thumb is that for every 100 pounds of pressure drop across a valve the gas temperature will drop by 7 F. When the same pressure is dropped across a gas expander the temperature drop is three times greater (21 F per 100 pounds pressure) because work is done, typically the shaft from the gas expander is connected to a power generator or a compressor. To thermal heat required to prevent formation of hydrates is normally provided by hot water boilers, heaters or waste heat from; gas turbines, gas engines or fuel cells. The products of combustion and or emissions from the above heating sources, are released to the atmosphere. The gases emitted from a fuel cell have a very high concentration of carbon dioxide thus making it economically attractive to recover it as a consumable product. The gases emitted from combustion applications can also be recovered but the economies of scale are not as attractive as a fuel cell due to a much lower concentration of carbon dioxide in the emissions stream.

SUMMARY OF THE INVENTION

According to the present invention there is provided a method to recover the emissions generated in these heat supplying devices, primarily carbon dioxide. A first step involve providing at least one heat exchanger, with a first flow path for passage of the incoming gas and a second flow path for passage of the returning gas to condense moisture in the gas. A second step involves passing a stream of dryer natural gas into a gas expander to substantially drop the temperature of the gas up to cryogenic temperature levels. The very cold stream enters a vessel to separate the formed condensates from the gas mixture. The formed condensates are natural gas liquids (ethane plus) which can be recovered if desired for the petrochemical industry. The sequentially along the first flow path of heat exchanger the very cold gaseous stream concurrently passes a stream of gaseous carbon dioxide sequentially along the second flow path of each heat exchanger, gaining heat from the carbon dioxide stream and the carbon dioxide gaining cold from the natural gas stream in this sequential heat exchanger to capture in a collection vessel the liquefied stream of carbon dioxide. This processes results in a cryogenic heat exchange in which the very cold natural gas is heated and the carbon dioxide is cooled in a counter current series of heat exchange to produce liquid and or solid carbon dioxide.

BRIEF DESCRIPTION OF THE DRAWINGS

These and other features of the invention will become more apparent from the following description in which reference is made to the appended drawing, the drawing is for the purpose of illustration only and is not intended to in any way limit the scope of the invention to the particular embodiment or embodiments shown, wherein.

DETAILED DESCRIPTION OF THE PREFERRED EMBODIMENT

Figure 1:
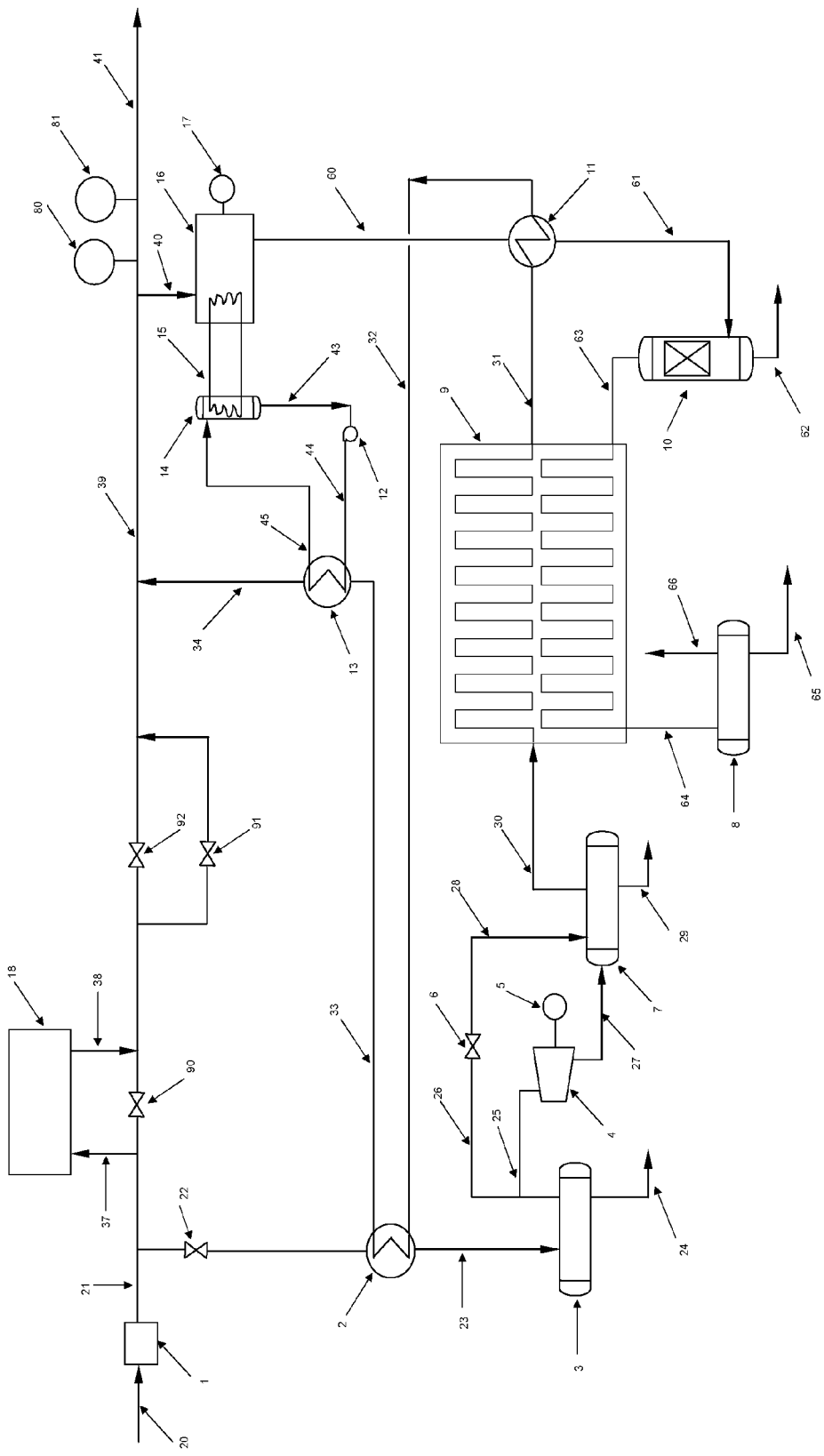
FIG. 1 is a schematic diagram of a method to condense and recover carbon dioxide at gas Metering and Pressure Reduction Stations in accordance with the teachings of the present invention, using turbo expanders.

The preferred method to recover and condense carbon dioxide embodiment will now be described with reference to FIG. 1.

In this process cryogenic energy generated at gas Metering and Pressure Reduction Stations (MPRS) is recovered to condense carbon dioxide. The generation of cryogenic temperatures at MPRS is an efficient method to conserve and recover energy versus the current practice of consuming more energy (pre-heating the gas) to condense and recover carbon dioxide as a liquid and or as a solid for consumption as a commodity.

The present practice has a natural gas stream 20 entering a filter vessel 1. The filtered stream 21 is then routed through stream 37 to an hot water heat exchanger 18 for pre-heating to prevent the formation of hydrates downstream of pressure valves 91 and 92, the heat addition is controlled by temperature transmitter 80. The pre-heated gas stream 38 is then depressurized through a pressure control valves 91 and 92, this pressure reduction is controlled by pressure transmitter 81. This mode of operation does not produce any electrical power, it consumes gas to generate hot water for preheating the gas and the products of combustion are released to the atmosphere. In the proposed invention at an MPRS natural gas stream 20 first enters filter 1 to remove any solids present in the gas stream. The filtered gas stream 21 goes through block valve 22 and heat exchanger 2 where any water moisture present in the gas is cooled and condensed for removal and separation in vessel 3. The separated water is removed through stream 24. The moisture free gas stream 25 is routed through gas expander 4, where the gas pressure is reduced to the local pressure line distribution pressure settings (typically 100 PSIG) controlled by pressure transmitter 81. The gas expander moves a power generator 5 to produce electricity. A bypass gas line 28 complete with a pressure reducing valve 6 is provided for startup and emergencies. The very cold gas stream 27 enters vessel 7 where natural gas liquids are separated and can be removed through stream 29. The very cold gas stream 30 enters the cold box 9 where it gains heat from the counter current carbon dioxide stream. The warmer gas stream 31 enters exchanger 11 where it picks up further heat from the carbon dioxide exiting the fuel cell. The gas stream 32 picks up additional heat at exchanger 2 from the incoming gas to be depressurized and enters exchanger 13 where hot water from the fuel cell pre-heats the gas to a preset temperature controlled at temperature transmitter 80. The temperature controlled stream 34 then enters stream 39 for local gas distribution and gas supply to fuel cell. A fuel cell 16 receives gas through stream 40 and is converted into hydrogen and carbon dioxide. The hydrogen is reacted with oxygen to generate power 17 and heat. The heat is captured by circulating coil 15 which interconnects the fuel cell and an hot water drum 14. A water pump 12 circulates the hot water through exchanger 13 to pre-heat the gas to local distribution temperature setting.

The carbon dioxide stream 60 leaving the fuel cell is pre-cooled at heat exchanger 11 to condense any moisture present in the stream. The condensate is removed in vessel 10 through stream 62. The moisture free stream 63 rich in gaseous carbon dioxide enters cold box 9 where in a counter current flow with natural gas is cooled and condensed for separation and recovery in vessel 8. Non-condensables are released through vent 66 and liquid carbon dioxide is stored through stream 65.

Figure 2:
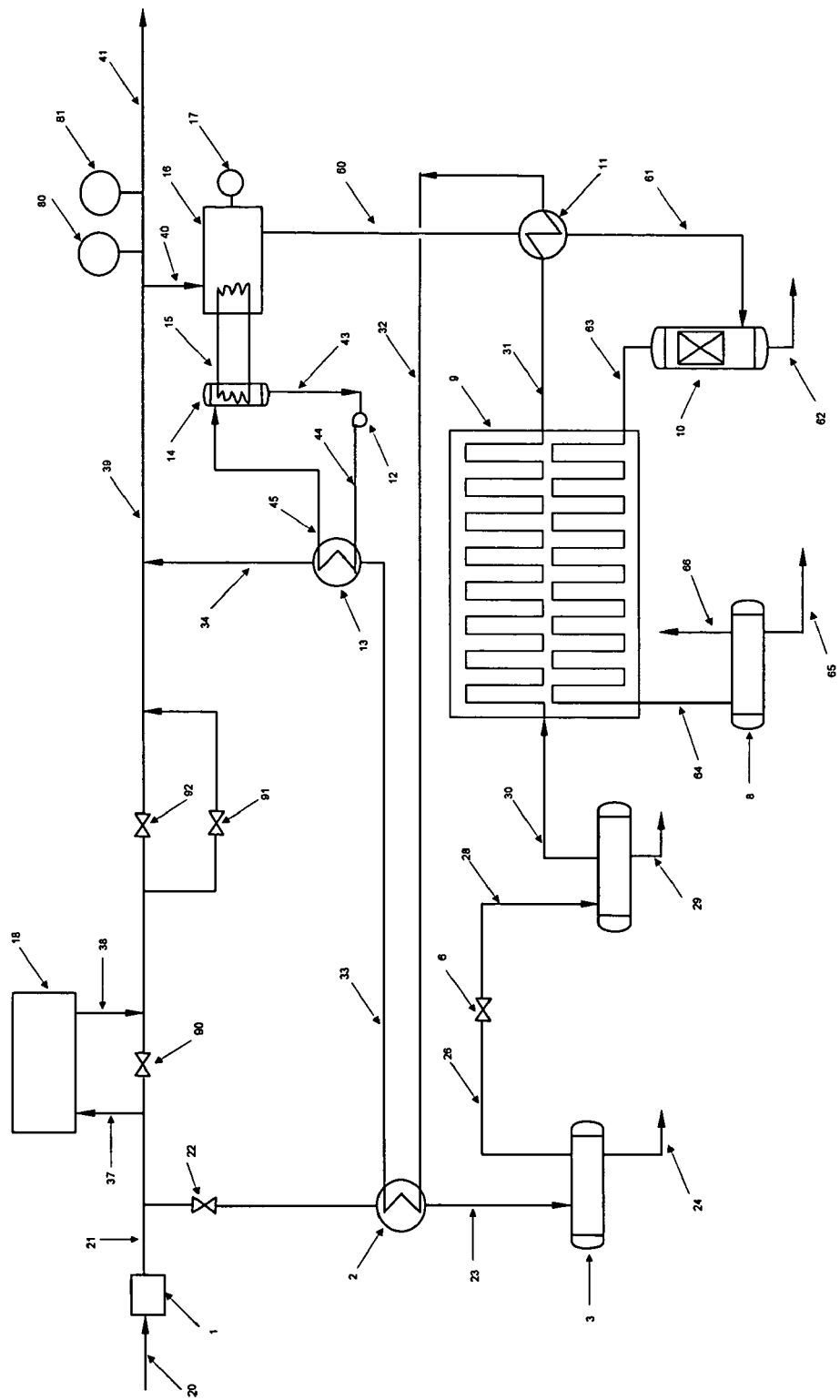
FIG. 2 is a schematic diagram of a method to condense and recover carbon dioxide at gas Metering and Pressure Reduction Stations in accordance with the teachings of the present invention, using pressure reduction valves.

The process cools a stream rich in gaseous carbon dioxide, recovering it in a liquid and or solid state using cryogenic temperatures generated by expanding the gas at Metering and Pressure Reduction Stations. The pressure reduction generates cold energy which can be achieved by both and or either a gas expander or as shown in FIG. 1 or a pressure reducing valve as shown in FIG. 2. The gas expander generates considerable more cold energy, it is nearly isentropic whereas the pressure reduction valve is isenthalpic.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A method to cool and condense a stream rich in carbon dioxide, comprising the steps of:

positioning more than one heat exchanger at a metering and pressure reduction station (MPRS), each heat exchanger having a first flow path for passage of a first fluid and a second flow path for passage of a second fluid;

passing a stream of cold natural gas entering the MPRS sequentially along the first flow path of each heat exchanger with the cold natural gas being heated through a series of heat exchanges;

positioning at least one fuel cell at the MPRS that converts natural gas into hydrogen;

passing a gaseous stream rich in gaseous carbon dioxide produced as a byproduct of operation of the at least one fuel cell along the second flow path of at least one of the more than one heat exchanger, a heat exchange being effected with the cold natural gas in order to condense moisture in the gaseous stream rich in carbon dioxide, the gaseous stream rich in carbon dioxide then being passed through a separator to separate the gaseous stream rich in carbon dioxide into a water moisture stream and a gaseous carbon dioxide stream, the gaseous carbon dioxide stream exiting the separator then being passed along a second flow path of another of the more than one heat exchanger with condensed carbon dioxide from the gaseous carbon dioxide stream being captured in collection vessels, a portion of the natural gas exiting the more than one heat exchanger being diverted for consumption in the at least one fuel cell, with a majority of the natural gas exiting the more than one heat exchanger being routed for distribution to and consumption in a downstream municipal gas distribution network;

the fuel cell having a cooling coil that extends from the fuel cell into a fluid reservoir holding a fluid medium;

passing the fluid medium from the fluid reservoir along the second flow path of one of the more than one heat exchanger to effect a heat exchange between the fluid medium and a stream of natural gas; and passing a stream of natural gas along the second flow path of one of the more than one heat exchanger, after said stream of natural gas has been heated by being passed along the first stream of at least one of the more than one heat exchanger.

\* \* \* \* \*